United States Patent
Zizler

(12) 
(10) Patent No.: US 6,680,836 B1
(45) Date of Patent: Jan. 20, 2004

(54) TIMED TRIPPING CIRCUIT FOR AN ELECTROMECHANICAL SWITCHING DEVICE

(75) Inventor: Josef Zizler, Freudenberg (DE)

(73) Assignee: Siemens Aktiengesellschaft, Munich (DE)

( * ) Notice: Subject to any disclaimer, the term of this patent is extended or adjusted under 35 U.S.C. 154(b) by 157 days.

(21) Appl. No.: 10/048,823

(22) PCT Filed: Jul. 28, 2000

(86) PCT No.: PCT/DE00/02507
§ 371 (c)(1),
(2), (4) Date: Feb. 1, 2002

(87) PCT Pub. No.: WO01/09910
PCT Pub. Date: Feb. 8, 2001

(30) Foreign Application Priority Data

Aug. 3, 1999 (DE) .......................... 199 36 406

(51) Int. Cl.[7] ................................ H02H 3/14
(52) U.S. Cl. ...................................... 361/89
(58) Field of Search ............... 361/67, 70, 86, 361/88, 89, 91.1, 91.3, 92, 139, 160, 195, 196, 202

(56) References Cited

U.S. PATENT DOCUMENTS 4,128,856 A * 12/1978 MacLeod ................. 361/156
5,296,786 A * 3/1994 Habisohn et al. .......... 318/280

FOREIGN PATENT DOCUMENTS

DE    32 39 840 A1    5/1984

OTHER PUBLICATIONS

Patent Absract of Japan, 56012710, Feb. 7, 1981.

* cited by examiner

Primary Examiner—Matthew V. Nguyen
(74) Attorney, Agent, or Firm—Harness, Dickey & Pierce, P.L.C.

(57) ABSTRACT

An electromechanical switching device can be tripped in a quick and reliable timed manner. The timed tripping circuit includes a voltage-sensitive switching element which separates an energy storage mechanism from the switching device when the supply voltage falls below a specific voltage limit which is higher than the withstand voltage of the switching device.

20 Claims, 2 Drawing Sheets

TIMED TRIPPING CIRCUIT FOR AN ELECTROMECHANICAL SWITCHING DEVICE

This application is the national phase under 35 U.S.C. §371 of PCT International Application No. PCT/DE00/02507 which has an International filing date of Jul. 28, 2000, which designated the United States of America, the entire contents of which are hereby incorporated by reference.

FIELD OF THE INVENTION

The present invention generally relates to a tripping delay circuit for an electromechanical switching device. Preferably, it relates to one wherein two input terminals are included, via which the tripping delay circuit can be fed an input voltage, and two output terminals, via which a supply voltage can be applied to the switching device. The output terminals may be connected to each other via an energy storage mechanism, the energy storage mechanism allowing a dip in the input voltage to be bridged, at least for a short time. The switching device may change its switching state when the supply voltage falls below a withstand voltage.

BACKGROUND OF THE INVENTION

A tripping delay circuit of this type is generally known. DE 32 39 840 C2 is cited by way of example.

During the tripping of an electromagnetic switching device (contactor or relay), it may happen that, although the switching device initially drops out when the voltage falls below its withstand voltage, it then briefly reverses its direction of movement again or at least drops out considerably more slowly. This may lead to increased contact wear in the switching device. Furthermore, effects on a load switched by the switching device may occur.

SUMMARY OF THE INVENTION

An object of the present invention is to design a tripping delay circuit. Preferably it is designed in such a way that a quick, reliable switching of the switching device takes place when the switching state changes due to falling of the supply voltage.

An object is achieved by a tripping delay circuit having a voltage-sensitive switching element. Preferably, it is one which separates the energy storage mechanism from the output terminals when the supply voltage falls below a limiting voltage, the limiting voltage being greater than the withstand voltage.

This can occur because, as a result, when the supply voltage falls, an energy supply to the switching device is completely interrupted even before the withstand voltage is reached, so that said device drops out quickly and with certainty.

If the limiting voltage is adjustable, the tripping delay circuit can be used universally for different electromechanical switching devices.

Preferably, the supply voltage has a nominal voltage and the output terminals are connected to each other via an overvoltage protection element, which becomes current-conducting if an overvoltage which is greater than the nominal voltage drops across it. This is so because, as a result, an effective overvoltage protection for the connected switching device takes place on the one hand, and the magnetic energy stored in the switching device is quickly transformed into heat on the other hand.

If the output terminals are connected to the input terminals, the voltage-sensitive switching element is preferably arranged in such a way that it separates one of the input terminals from one of the output terminals. It is also possible, however, for it to be arranged in such a way that is separates only the energy storage mechanism from the output terminals.

The energy storage mechanism may be designed for example as a storage capacitor with which a charging resistor is connected in series.

The voltage-sensitive switching element may be designed for example as a relay with a Zener diode connected in series.

Alternatively, the voltage-sensitive switching element may be designed as a semiconductor switch.

BRIEF DESCRIPTION OF THE DRAWINGS

Further advantages and details emerge from the remaining claims and the following description of an exemplary embodiment. In the basic representation.

DETAILED DESCRIPTION OF THE PREFERRED EMBODIMENTS

Figure 1:
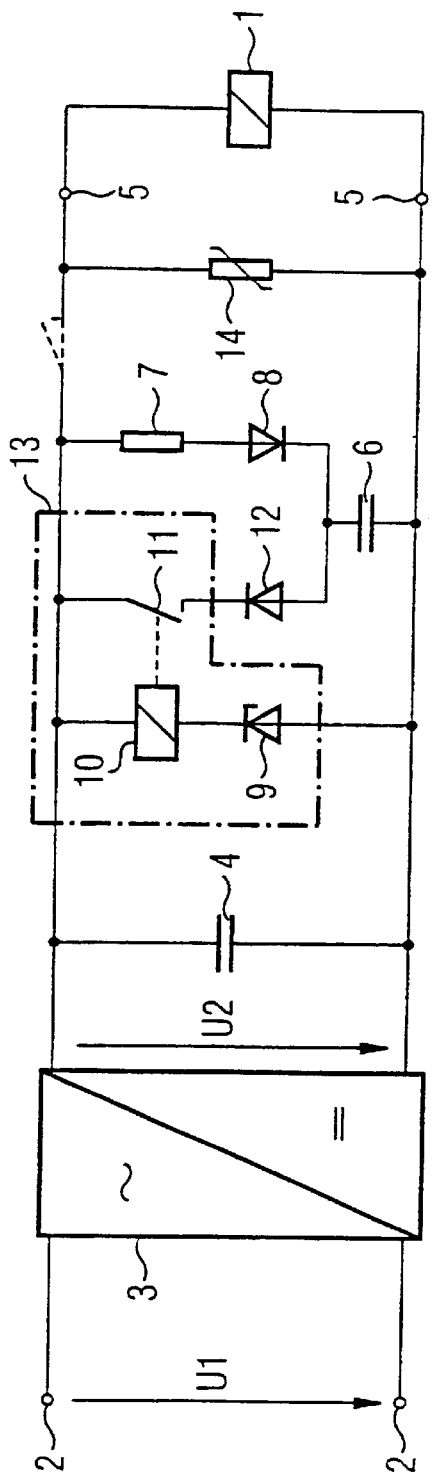
FIG. 1 shows a tripping delay circuit with an electromechanical switching device.

According to FIG. 1, a tripping delay circuit is connected upstream of an electromechanical switching device 1. According to the exemplary embodiment, the switching device 1 is designed as a contactor. However, it could similarly be designed as a relay.

The tripping delay circuit has two input terminals 2, via which an input voltage U1 can be fed to the tripping delay circuit. Arranged downstream of the input terminals 2 is a rectifier circuit 3, which is assigned a backup capacitor 4. The backup capacitor 4 serves for smoothing a supply voltage U2, which is output by the rectifier circuit 3. The supply voltage U2 is fed to two output terminals 5, via which the supply voltage U2 can be applied to the switching device 1.

The switching device 1 changes its switching state when the supply voltage U2 falls below a withstand voltage. To prevent the switching device 1 from dropping out immediately when there are brief dips in the input voltage U1, the output terminals 5 are connected to each other via an energy storage mechanism 6. A dip in the input voltage U1 can be bridged, at least for a short time, by the energy storage mechanism 6. According to FIG. 1, the energy storage mechanism 6 is designed as a storage capacitor 6, upstream of which a charging resistor 7 and a charging diode 8 are connected.

The tripping delay circuit has a relay with a relay coil 10 and a relay contact 11. Connected in series with the relay coil 10 is a Zener diode 9. When the full input voltage U1 is applied to the input terminals 2, the backup capacitor 4 and the energy storage mechanism 6 are fully charged. Therefore, current flows through the Zener diode 9, so that the relay coil 10 keeps the relay contact 11 closed. The storage capacitor 6 is therefore coupled to the output terminals 5 via a discharging diode 12.

The Zener diode 9 has a Zener voltage, which lies above the withstand voltage, but is less than a nominal voltage which the supply voltage U2 normally has. The Zener diode 9, the relay coil 10 and the relay contact 11 therefore form a voltage-sensitive switching element 13, which separates the energy storage mechanism 6 from the output terminals 5 when the supply voltage U2 falls below a limiting voltage which is slightly greater than the Zener voltage of the Zener diode 9. The limiting voltage is therefore greater than the withstand voltage, but is less than the nominal voltage.

If the input voltage U1 then dips or is switched off, the switching device 1 is still supplied with current for a short time via the storage capacitor 6 and the discharging diode 12. As this happens, the supply voltage U2 falls. When the supply voltage U2 reaches the limiting voltage, the relay contact 11 drops out and the storage capacitor 6 is separated from the output terminals 5. This suddenly cuts off any further energy supply to the switching device 1. The latter therefore drops out quickly.

When the circuit is abruptly interrupted, the electromagnetic switching device 1 generates a high induction voltage, which may be considerably greater than the nominal voltage. Therefore, the output terminals 5 are connected to each other via an overvoltage protection element 14. The overvoltage protection element 14 may be designed for example as a varistor 14. Alternatively, a design as a pair of Zener diodes connected back-to-back in series in connection with a current-limiting resistor would be possible. The overvoltage protection element 14 becomes current-conducting when an overvoltage which is greater than the nominal voltage drops across it. As a result, the switching device 1 is protected from being damaged.

According to FIG. 1, the output terminals 5 are connected to the input terminals 2 (indirectly via the rectifier circuit 3). The voltage-sensitive switching element 13 is arranged in such a way that it only separates the storage capacitor 6 from the output terminals 5. The relay contact 11 can also be arranged, however, in such a way that one of the output terminals 5 is additionally separated from one of the input terminals 2. This is indicated in FIG. 1 by the alternative position of the relay contact 11 shown by dashed lines.

Figure 2:
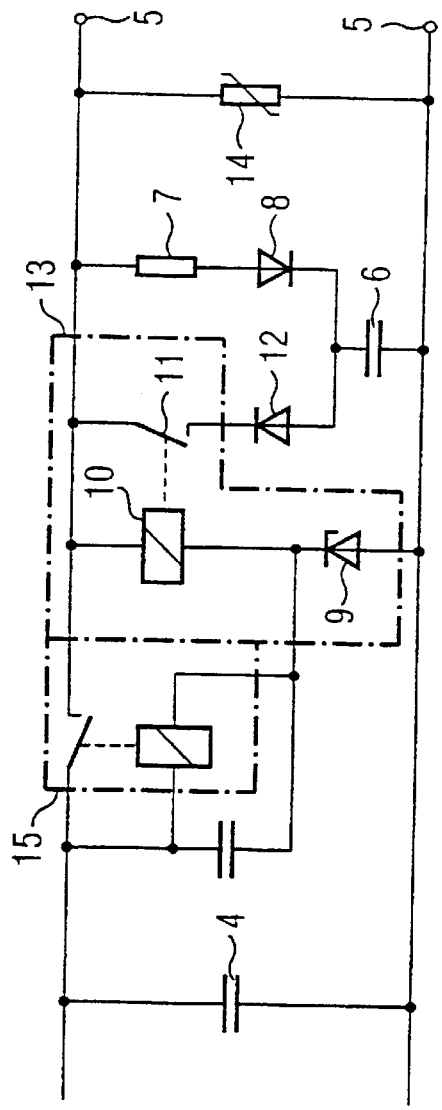
FIG. 2 shows a further tripping delay circuit and FIG. 3 likewise shows a further tripping delay circuit.

The tripping delay circuit according to FIG. 2 corresponds essentially to the tripping delay circuit of FIG. 1. Here, however, connected upstream of the voltage-sensitive switching element 13 is a further voltage-sensitive switching element 15. Otherwise, the tripping delay circuit according to FIG. 2 is designed in a similar way to that according to FIG. 1.

Figure 3:
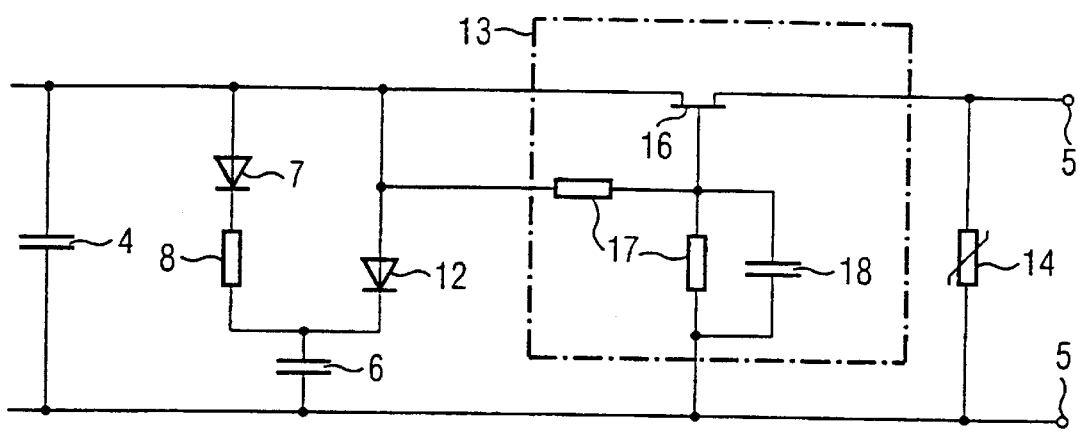

In the case of the tripping delay circuit according to FIG. 3, the voltage-sensitive switching element 13 is designed as a semiconductor switch 16, to which wiring resistors 17 and a wiring capacitor 18 are assigned. In particular in the case of this embodiment, a simple adjustability of the limiting voltage is provided by one of the wiring resistors 17 or both wiring resistors 17 being of a variable design. However, a simple adjustability of the limiting voltage can also be achieved in the case of the exemplary embodiments according to FIGS. 1 and 2 by a suitable upstream arrangement of the voltage-sensitive switching element 13.

With the tripping delay voltage according to the invention, on the one hand a delayed tripping of the switching device 1 is still obtained when there are voltage dips, on the other hand however a rapid, reliable switching of the switching device 1, free from reversals and delays, is obtained when the limiting voltage is exceeded.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tripping delay circuit for an electromechanical switching device, comprising:
   at least two input terminals, via which the tripping delay circuit can be fed an input voltage;
   at least two output terminals, via which a supply voltage can be applied to the switching device, the output terminals being connected to each other via an energy storage mechanism, wherein the energy storage mechanism permits a dip in the input voltage to be bridged, at least for a short time, and wherein the switching device changes its switching state when the supply voltage falls below a withstand voltage; and
   a voltage-sensitive switching element, which separates the energy storage mechanism from the output terminals when the supply voltage falls below a limiting voltage, the limiting voltage being greater than the withstand voltage.

2. The tripping delay circuit as claimed in claim 1, wherein the limiting voltage is adjustable.

3. The tripping delay circuit as claimed in claim 1, wherein the supply voltage includes a nominal voltage and wherein the output terminals are connected to each other via an overvoltage protection element, which becomes current-conducting if an overvoltage which is greater than the nominal voltage drops across it.

4. The tripping delay circuit as claimed in claim 1, wherein the output terminals are connected to the input terminals and wherein the voltage-sensitive switching element is arranged such that it separates one of the input terminals from one of the output terminals.

5. The tripping delay circuit as claimed in claim 1, wherein the output terminals are connected to the input terminals and wherein the voltage-sensitive switching element is arranged such that it only separates the energy storage mechanism from the output terminals.

6. The tripping delay circuit as claimed in claim 1, wherein the energy storage mechanism includes a storage capacitor with which a charging resistor is connected in series.

7. The tripping delay circuit as claimed in claim 1, wherein connected upstream of the voltage-sensitive switching element is a further voltage-sensitive switching element.

8. The tripping delay circuit as claimed in claim 1, wherein the voltage-sensitive switching element includes a relay with a Zener diode connected in series.

9. The tripping delay circuit as claimed in claim 1, wherein the voltage-sensitive switching element includes a semiconductor switch.

10. The tripping delay circuit as claimed in claim 1, wherein a rectifier circuit is arranged downstream of the input terminals.

11. The tripping delay circuit as claimed in claim 2, wherein the supply voltage includes a nominal voltage and wherein the output terminals are connected to each other via an overvoltage protection element, which becomes current-conducting if an overvoltage which is greater than the nominal voltage drops across it.

12. The tripping delay circuit as claimed in claim 2, wherein the output terminals are connected to the input terminals and wherein the voltage-sensitive switching element is arranged such that it separates one of the input terminals from one of the output terminals.

13. The tripping delay circuit as claimed in claim 3, wherein the output terminals are connected to the input terminals and wherein the voltage-sensitive switching element is arranged such that it separates one of the input terminals from one of the output terminals.

14. The tripping delay circuit as claimed in claim 2, wherein the output terminals are connected to the input terminals and wherein the voltage-sensitive switching element is arranged such that it only separates the energy storage mechanism from the output terminals.

15. The tripping delay circuit as claimed in claim 3, wherein the output terminals are connected to the input terminals and wherein the voltage-sensitive switching element is arranged such that it only separates the energy storage mechanism from the output terminals.

16. The tripping delay circuit as claimed in claim 2, wherein the energy storage mechanism includes a storage capacitor with which a charging resistor is connected in series.

17. The tripping delay circuit as claimed in claim 2, wherein connected upstream of the voltage-sensitive switching element is a further voltage-sensitive switching element.

18. The tripping delay circuit as claimed in claim 2, wherein the voltage-sensitive switching element includes a relay with a Zener diode connected in series.

19. The tripping delay circuit as claimed in claim 2, wherein the voltage-sensitive switching element includes a semiconductor switch.

20. The tripping delay circuit as claimed in claim 2, wherein a rectifier circuit is arranged downstream of the input terminals.

\* \* \* \* \*